United States Patent [19]

Smith et al.

[11] 4,117,361

[45] Sep. 26, 1978

[54] SOLVENTLESS IMPREGNATING COMPOSITION

[75] Inventors: James D. B. Smith, Turtle Creek; Robert N. Kauffman, Monroeville, both of Pa.

[73] Assignee: Westinghouse Electric Corp., Pittsburgh, Pa.

[21] Appl. No.: 540,184

[22] Filed: Jan. 10, 1975

[51] Int. Cl.$^2$ .................... H02K 3/30; C08G 59/68
[52] U.S. Cl. .................................... 310/208; 156/53; 174/120 SR; 260/37 EP; 260/830 TW; 428/417; 528/92; 528/103; 528/411; 528/418

[58] Field of Search ........ 260/830 TW, 2 EC, 37 EP, 260/47 EC; 156/53; 174/120 SR; 428/417; 310/208

[56] References Cited

U.S. PATENT DOCUMENTS

| 3,379,654 | 4/1968 | Seiz | 260/2 EC |
| 3,759,866 | 9/1973 | Rogers et al. | 260/830 TW |

*Primary Examiner*—Wilbert J. Briggs, Sr.
*Attorney, Agent, or Firm*—R. D. Fuerle

[57] ABSTRACT

A solventless impregnating composition is disclosed which is made by forming a mixture of a liquid diepoxide and about 10 to about 80 phr of a diglycidyl ether of a glycol. To this mixture is added a titanate catalyst in an amount sufficient to cure the composition.

25 Claims, No Drawings

SOLVENTLESS IMPREGNATING COMPOSITION

PRIOR ART

U.S. Pat. No. 3,759,866 discloses the use of the diglycidyl ether of neopentyl glycol as a reactive diluent in a solventless epoxy impregnating composition cured with an acid anhydride.

U.S. Pat. Nos. 3,123,582; 3,385,835; 2,962,410; 2,742,448; and 3,379,654 disclose the use of alkyl titanates as catalysts for epoxy resins.

The Kirk-Othmer Encyclopedia of Chemical Technology, 2nd Edition, Volume 20, pages 491 to 493 describes the use of titanium alkoxides to cure epoxy resins. Page 464 of the same book describes the reaction of titanium alkoxides with glycols to form titanium chelates.

BACKGROUND OF THE INVENTION

The coils or rotating electrical apparatus (e.g., a motor or generator) are insulated by lap-wrapping an insulating tape around them, placing them under a vacuum, impregnating the tape with a pressurized resin, and heat curing the resin.

A resin which is suitable for this application must, of course, be a liquid, and preferably a low viscosity liquid, so that it can easily flow around and through the insulating tape. The resin must also be solventless because any solvent which is present will be driven off during cure, leaving voids which readily break down under electrical stress. Also, the resin must be stable at room temperature for long periods of time so that a large batch of resin can be made up and stored instead of making small batches each time the resin is needed. In addition, the resin must, of course, have the mechanical and electrical properties required for coil insulation.

Until now one of the best solventless impregnating resins has been the anhydride- and phosphonium-cured epoxy resin described in U.S. Pat. No. 3,759,866. That resin has excellent electrical and mechanical properties and is easy to use in a vacuum-pressure impregnation process. However, the resin has a relatively short period of storage stability (about 90 to 100 days), and because moisture and contaminants decrease its storage stability it must be stored under anhydrous conditions.

A commercial alternative to the anhydride-cured resin is the BF$_3$:MEA (boron trifluoride-monoethylamine)-cured epoxy solventless resin. (See U.S. Pat. No. 2,938,880.) That resin has a much longer storage stability and is less sensitive to moisture and contaminants compared to the anhydride-cured impregnant. However, its electrical properties are not as good as desired and its tensile strength and tensile modulus at 100° C are zero.

SUMMARY OF THE INVENTION

We have discovered that an excellent solventless impregnating resin can be prepared by making a mixture of a liquid diepoxide and diglycidyl ether of diphenol, then adding an alkyl titanate catalyst.

The resins of this invention have very significantly lower power factors and dielectric constants at 125° C and 150° C compared to conventional BF$_3$:MEA-catalyzed impregnants, and are equal or superior to anhydride-catalyzed resins in this respect. Also, the resins have superior storage stability compared to prior anhydride-cured solventless impregnating resins and are less sensitive to moisture and contaminants, and are comparable or superior to the BF$_3$:MEA-catalyzed resin in this respect. The resins have adequate physical properties for solventless impregnants, and a good tensile strength and tensile modulus at 100° C although less than the anhydride-catalyzed resins.

DESCRIPTION OF THE INVENTION

A mixture is first prepared of a diepoxide and a reactive diluent and a titanate catalyst is added to the mixture. This order of addition appears to be critical since other sequences of combining the ingredients do not give satisfactory results. For example, if the catalyst is added directly to the diepoxide, gellation in patches ("popcorn" gellation) occurs at once. On the other hand, if the catalyst is added directly to the reactive diluent cure times for the resin are two or three times longer.

While we do not wish to be bound by theories, we speculate that the catalyst is forming a complex with the reactive diluent because a slight color change and viscosity increase are observed when the catalyst is added. Titanates are known to form complexes with glycols (see previously cited pages in Encyclopedia of Science) but complexes such as the ethylene glycol complex require unacceptably long cure times. Titanates alone, on the other hand, react with epoxy resins even at moderate temperatures (see previously cited pages in Encyclopedia of Science). Therefore, we speculate that the catalyst forms a complex with the reactive diluent which is very stable at room temperatures but which dissociates at elevated temperatures to effect the cure of the resin.

DIEPOXIDE

The diepoxide is a compound with two epoxide

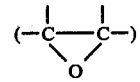

groups. Monoepoxides are not suitable because the tensile strength of the resulting resin is too low. Tri- and polyepoxides are not suitable because of their higher viscosities and the poor storage stability of the resin. The diepoxide must be a liquid at room temperature with a viscosity of less than about 15,000 cps, and preferably of less than about 350 cps, in order for the resulting resin to impregnate properly. Suitable diepoxides include cycloaliphatic diepoxides having epoxy equivalent weights (E.E.W.) of about 100 to about 350, and preferably about 120 to about 150, aliphatic diepoxides having an E.E.W. of about 350 to about 550 and preferably about 400 to about 500, and aromatic diepoxides (such as diglycidyl ethers of diphenols) and Novolac diepoxides having an E.E.W. of about 150 to about 600, and preferably about 165 to about 225. If the E.E.W. of the diepoxide is below the limit given the resulting resin tends to have poor electrical and mechanical properties, and if the E.E.W. is above the limit given, the storage stability of the resulting resin is poor and its viscosity is too high. Examples of suitable aliphatic diepoxides include 4-bis(2,3-epoxypropoxy) butane and 1,2-bis(2,3-epoxy-2-methyl-propoxy)ethane.

Examples of suitable cycloaliphatic diepoxides include vinylcyclohexenediepoxide, limonene diepoxide,
(3,4-epoxy-cyclohexylmethyl)-3,4-epoxy-cyclohexane carboxylate,
(3,4-epoxy-t-methyl-cyclohexylmethyl)-3,4-epoxy-6-methylcyclohexanecarboxylate,
3-(3',4'-epoxycyclohexyl)-9,10-epoxy-2,4-dioxaspiro (5,5) undecane,
3-(3',4'-epoxy-6-methyl-cyclohexyl)-9,10-epoxy-7-methyl-2,4-dioxaspiro (5.5) undecane,
dicyclopentadienediepoxide,
bis(cyclopentenyl)ether diepoxide,
2,3-epoxybutyl-2,3-epoxycyclopentylether,
epoxypentyl-2,3-epoxycyclopentylether,
9,10-epoxystearyl-2,3-cyclopentylether
3,4-epoxycyclohexylmethyl-2,3-cyclopentylether,
2,2,5,5-tetramethyl-3,4-epoxycyclohexylmethyl-2,3-cyclopentylether, and
2,2,5,5,6-pentamethyl-3,4-epoxycyclopentylether.

Examples of suitable aromatic diepoxides include di-2,3-epoxypropyl isophthalate,
di-2,3-epoxypropyl phthalate,
o-(2,3-epoxypropyl)phenyl-2,3-epoxypropyl ether,
1,3-bis-(2,3-epoxypropoxy)benzene,
2,2-bis[p-(2,3-epoxypropoxy)phenyl]-propane,
2,2-bis(p-2,3-epoxypropoxy-phenyl)-1,1,1,3,3,3-hexafluoropropane,
2,2-bis[p-(2,3-epoxypropoxy)phenyl]nonadecane, and
4,4-bis(2,3-epoxypropyl)phenyl ether, An example of a suitable Novolac diepoxide is 2,2,bis[p-(2,3-epoxypropoxy)phenyl]-methane.

The preferred diepoxides are the diglycidyl ether of bisphenol A because it is readily available commercially and gives resins of high thermal stability and 3,4-epoxycyclohexylmethyl-3,4-epoxycyclohexane-carboxylate because it gives lower viscosity resins. Mixtures of diepoxides are also contemplated; for example, the diglycidyl ether of bisphenol A and 3,4-epoxy-cyclohexylmethyl-3,4-epoxycyclohexanecarboxylate may be mixed to obtain both higher thermal stability and lower viscosity.

REACTIVE DILUENT

The reactive diluent is a diglycidyl ether of a glycol and may be described as the reaction product of an epihalohydrin and a glycol. The reactive diluent must be a diglycicyl ether in order for the reason to have the necessary storage stability and tensile strength. Suitable glycols include those having the general formula HO—R—OH where R is a divalent aliphatic ether group, an alkylidene group, or an alkylene group.

The glycol should have about 2 to about 12 carbon atoms in order to form an effective reactive diluent. Linear, branched, and unsaturated glycols may be used. Glycols which are preferred due to their low viscosities are those with two to five carbon atoms, especially ethylene glycol, propylene glycol, 1,4-butanediol, and neopentyl glycol. Mixtures of reactive diluents are also contemplated.

The amount of reactive diluent should be at least about 10 phr (parts per hundred parts of resin, where "resin" means the weight of diepoxide plus reactive diluent) since at less than 10 phr the composition is too viscous. The amount of reactive diluent should be less than about 80 phr since a greater amount results in poor physical and electrical properties. The best properties are usually obtained if about 30 to about 60 phr of the reactive diluent is used.

CATALYST

The catalyst is a titanate of the general formula:

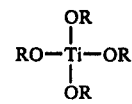

where each R group is independently selected from alkyl from $C_1$ to $C_{10}$, aliphatic, aryl, alkylaryl, cyclic, and heterocyclic. The catalyst must be completely soluble in the composition so that it does not separate out and leave portions undercured. Examples include tetrabutyl titanate, tetra-2-ethylhexyl titanate, tetrabenzyl titanate, etc. The preferred catalysts are alkyl titanates, particularly tetrabutyl titanate and tetra-2-ethylhexyl titanate, because they are readily available and are highly soluble in the resin. The catalyst of this invention is a latent catalyst (i.e., one which will not cure the resin at ambient temperatures, but will cure it at elevated temperatures, usually in excess of 100° C). A latent catalyst is required because the liquid composition must be stored for long periods since it is impractical to mix up a new batch each time it is needed.

The amount of catalyst used depends upon the diepoxide used. For aromatic diepoxides at least about 5 phr is usually necessary for a reasonable gel time and more than about 15 phr may shorten the shelf life of the composition and cause the catalyst to precipitate. About 7½ to about 10 phr of catalyst is preferred for aromatic diepoxides. For aliphatic and cycloaliphatic diepoxides at least about 0.1 phr is usually necessary for a reasonable gel time and at more than about 1 phr the composition may polymerize on storage. About 0.4 to about 0.6 phr of catalyst is preferred for aliphatic and cycloaliphatic diepoxides. If a mixture of aromatic and aliphatic or cycloaliphatic diepoxides are used or diepoxides which have properties intermediate to aromatic and aliphatic or cycloaliphatic epoxies, the amount of catalyst used should also be proportioned.

OPTIONAL INGREDIENTS

The composition may also contain various optional ingredients, such as a filler. A filler can be used to increase the insulating properties of the composition, but if the composition is to be used as an impregnating resin a filler is preferably not used as it tends to make the resin too viscous. In any case more than about 80 phr of a filler will usually make the composition too viscous for most applications. Suitable fillers include silica gel, clay, mica, calcium carbonate, magnesium oxide, calcium oxide, or zinc oxide.

If the composition is to be used in high voltage applications it is preferable to include in it about 50 to about 70 phr of a corona suppressant such as alumina trihydrate, zircon, or zirconium silicate.

USE OF COMPOSITION

After the initial composition is prepared it can be stored or used at once as an impregnating resin or for other purposes. To use as an impregnating resin, a conductor such as a motor or generator coil is first wound with an insulating tape through or around which the resin can pass. Suitable types include glass tapes, Dacron tapes (i.e., polyethylene terephthalate), Nomex tapes (i.e., a polyamide), Nomex M tapes (mica integrated with polyamide fibers), and paper. The preferred tape is mica tape as it is the best insulator. Mica tape usually comes with a glass or Dacron backing to which the mica is bonded by a bisphenol A epoxy adhesive.

The tape can be either lap wrapped or butt wrapped over the conductor and can be almost any width, although about ½ to about 1½ inches is typical. A tape which is too thick may hinder the impregnation process; about 3 to about 10 mils is considered suitable. It is common practice to use two layers of tape, an inside ground wall tape preferably of mica, and an outside binding tape, preferably of glass or glass-Dacron.

The wrapped conductor is placed in a vacuum chamber and the air pressure is decreased to draw the air out from under the insulation. The impregnating resin is admitted to the chamber and covers the wrapped conductor. Pressure is then applied to the resin to force it into all of the interstices in and under the insulation. This process is known to the art as the vacuum-pressure impregnation (VPI) process and the resin used in the process is referred to as a VPI resin.

The impregnated conductor is then removed from the chamber and placed in an oven for curing. The cure may be conducted at about 135° to about 200° C, but about 150° to about 180° C is preferred. About ½ to about 48 hours, and preferably about 8 to 24 hours, is required for curing.

The following examples further illustrate this invention.

EXAMPLE I

Various compositions were prepared using a low viscosity (7000 to 10,000 cps at 25° C) liquid diglycidyl ether of bisphenol A (E.E.W. = 182 to 189) sold by Ciba-Geigy under the trademark "Araldite 6005" (Compositions Number 1 to 8), or 3,4-epoxycyclo-hexylmethyl-3,4-epoxycyclohexane carboxylate sold by Union Carbide under the trademark "ERL-4221," E.E.W. = 133, (Compositions Number 9 to 11). The reactive diluent used was the diglycidyl ether of neopentyl glycol (DGENPG) E.E.W. = 150, and the catalyst was tetrabutyl titanate. The compositions were prepared by first mixing the diglycidyl ether and the reactive diluent, then adding the catalyst.

The initial viscosity of the composition was measured and the gel time and storage stability were determined. The following table gives the compositions (in parts by weight) and the results:

| Composition Number | Composition | | | Gel Time (Minutes) | | Initial Viscosity at 25° C (cps) | Storage Stability at Room Temp. (days) |
|---|---|---|---|---|---|---|---|
| | Diepoxide | DGENPG | Catalyst | 150° C | 175° C | | |
| 1 | 70 | 30 | 5.0 | 105–115 | 60–70 | 275 | 190 |
| 2 | 70 | 30 | 10.0 | — | 30–35 | 237 | 220 |
| 3 | 60 | 40 | 10.0 | — | 25–30 | 135 | 210 |
| 4 | 50 | 50 | 10.0 | — | 25–30 | 70 | 250 |
| 5 | 40 | 60 | 10.0 | — | 35–40 | 40 | 170 |
| 6 | 30 | 70 | 10.0 | — | 30–35 | 22 | 180 |
| 7 | 50 | 50 | 7.5 | — | 30–35 | 75 | 200 |
| 8 | 70 | 30 | 7.5 | — | 50–60 | 237 | 200 |
| 9 | 70 | 30 | 1.0 | 5–10 | — | 80 | 14 |
| 10 | 60 | 40 | 0.5 | — | 15–20 | 57 | 160 |
| 11 | 60 | 40 | 1.00 | — | — | 57 | — |

In the above table the gel time data was obtained using 10gm. samples in aluminum dishes. The gel time is the time required for the resin to solidify at the cure temperature. The storage stability tests were performed using a Gardner-Holdt bubble viscometer to determine the time at 24° to 27° C required for the catalyzed compositions to attain a viscosity of 1000 cps.

The electrical properties of some of the compositions were determined at a frequency of 60Hz using ⅛ inch to ¼ inch castings made by curing the compositions at 175° C for 16 to 48 hours. For comparison similar data was obtained using as a control a widely-used commercial $BF_3$:MEA-catalyzed solvent-less impregnant of the following formulation:

| | Parts by Weight |
|---|---|
| "Araldite 6005" diepoxide | 70 |
| diglycidyl ether of 1,4-butanediol | 30 |
| a complex of 1 part boron trifluoride-1 part monoethylamine | 2 |
| furfuryl alchol | 6.5 |

The following table gives the results of the electrical tests:

| Composition Number | Cure Conditions | 25° C | | 125° C | | 150° C | |
|---|---|---|---|---|---|---|---|
| | | 100 tan δ | ε' | 100 tan δ | ε' | 100 tan δ | ε' |
| Control | 16 hrs at 150° C | 2.1 | 4.1 | 237.0 | 177.0 | * | * |
| Control | 16 hrs at 180° C | 0.60 | 4.2 | 241.0 | 100.0 | * | * |
| 1 | 16 hrs at 115° C plus 16 hrs at 170° C | 1.4 | 3.8 | 2.8 | 5.1 | 14.0 | 4.9 |
| 4 | 24 hrs at 175° C | — | — | 3.3 | 5.4 | 18.3 | 5.1 |
| 6 | 16 hrs at 175° C | — | — | 7.0 | 5.0 | 9.2 | 4.7 |
| 9 | 16 hrs at 150° C | — | — | 3.5 | 4.5 | 2.6 | 5.1 |
| 10 | 16 hrs at 175° C | — | — | 4.1 | 6.0 | 18.2 | 5.9 |
| 10 | 16 hrs at 175° C plus 16 hrs at 200° C | — | — | 3.5 | 5.8 | 11.8 | 5.7 |

*Value too high and unstable for meaningful measurement

The above table clearly shows a dramatic reduction in power factor (100 tan δ) and dielectric constant (ε') in the compositions of this invention over the control compositions at temperatures of 125° C and 150° C.

Cured samples of Composition Number 4 and of the control were exposed to 2 atmospheres of steam in a pressure cooker to determine their resistance to humidity. Both samples show a maximum weight gain after about a one week exposure. After two weeks the weight gain of Composition Number 4 had levelled off to about 2.5% increase in weight and the control had levelled off to about 3.2% increase in weight.

Several of the compositions were cured and tested for tensile properties at 100° C. The following table gives the results.

| Composition Number | Cure Conditions | Tensile Data at 100° C | | |
|---|---|---|---|---|
| | | Tensile Strength (psi) | Tensile Modules (psi) | Elongation |
| 10 | 16 hrs at 150° C plus 16 hrs at 175° C | 145.4 | 5,170 | 2.9 |
| 10 | 16 hrs at 150° C plus 16 hrs at 175° C | 170.0 | 4,400 | 4.0 |
| 11 | 32 hrs at 175° C | 146.0 | 2,120 | 5.8 |
| 4 | 32 hrs at 175° C | 165.0 | 2,720 | 5.5 |
| 4 | 32 hrs at 175° C | 173.0 | 2,230 | 5.6 |
| 2 | 32 hrs at 175° C | 117.0 | 2,210 | 5.0 |
| 2 | 32 hrs at 175° C | 156.1 | 2,260 | 6.2 |
| 2 | 48 hrs at 175° C | 317.8 | 3,880 | 7.2 |

The $BF_3$:MEA-catalyzed control composition had zero tensile strength and zero tensile modules when tested at 100° C.

EXAMPLE II

Example I was repeated using a bisphenol F diepoxide instead of the bisphenol A diepoxide. Similar results were obtained.

EXAMPLE III

Example I was repeated using 3,4-epoxycyclohexylmethyl-3,4-epoxycyclohexane carboxylate sold by Ciba-Geigy Co. under the trademark "CY-179." The amount of catalyst was reduced to ½%. Similar results were obtained.

EXAMPLE IV

Example I was repeated using a diepoxide sold by Ciba-Geigy Co. under the trademark "CY-183," believed to be diglycidyl ester of hexahydrophthalic acid or hexahydroisophthalic acid. Because the reactivity of this diepoxide is inbetween that of aromatics and aliphatics, 3% catalyst was used. Similar results were obtained.

EXAMPLE V

Example I was repeated except that the reactive diluent was the diglycidyl ether of 1,4-butanediol, sold by Ciba-Geigy Co. under the trademark "RD2." The results were similar except that the thermal stability and tensile properties were somewhat lower, although still acceptable and still superior to the control sample which used a $BF_3$:MEA catalyst.

EXAMPLE VI

Example I was repeated using as a reactive diluent the diglycidyl ether of ethylene glycol. Similar results were obtained except that the thermal stability and tensile properties were somewhat lower, although still acceptable and still superior to the control sample which used a $BF_3$:MEA catalyst.

EXAMPLE VII

Example I was repeated using 2-ethyl hexyl titanate as a catalyst. Similar results were obtained.

EXAMPLE VIII

Using the procedure of Example I the following compositions were prepared:

| Composition Number | Titanate Catalyst | Amount of Catalyst (parts) | Diepoxide | Amount of Diepoxide (parts) | Diglycidyl ether of Neopentyl glycol (parts) |
|---|---|---|---|---|---|
| 1 | tetrabutyl | 5.0 | "Araldite 6005" | 70 | 30 |
| 2 | tetrabenzyl | 5.0 | "Araldite 6005" | 70 | 30 |
| 3 | tetra-2 ethyl hexyl | 5.0 | "Araldite 6005" | 70 | 30 |
| 4 | tetraethyl | 10.0 | "Araldite 6005" | 50 | 50 |
| 5 | tetrabutyl | 1.0 | "Gly-Cel A-100" | 50 | 50 |
| 6 | tetrabutyl | 1.0 | "Gly-Cel C-200" | 50 | 50 |

"Gly-Cel A-100" is a Celanese trademark for a low viscosity aromatic diglycidyl ester and "Gly-Cel C-200" is a Celanese trademark for a low viscosity cycloaliphatic glycidyl ester.

The gel time and storage stability were measured as in Example I. The following table gives the results.

| Composition Number | Gel Time (minutes) | | Storage Stability at 25° C (days) |
|---|---|---|---|
| | 150° C | 175° C | |
| 1 | 110–115 | 65–70 | >150 |
| 2 | >250 | 200–210 | — |
| 3 | >250 | 170–180 | 50 |
| 4 | — | 25–35 | >50 |
| 5 | — | 70–80 | >300 |
| 6 | — | 40–50 | 224 |

The above results show that the tetrabutyl and tetraethyl titanates are more effective catalysts than either tetra-2-ethylhexyl or tetrabenzyl titanate with aromatic diglycidyl ethers. The above results also show that the tetrabutyl catalyst produces the greatest storage stability of the catalysts tested in this example.

EXAMPLE IX

Using the procedures of Example I, the following compositions were prepared: (in parts by weight) and tested for gel time, viscosity, and storage stability.

| "ERL-4221" | DGENPG | Tetrabutyl titanate | Gel Time (minutes) | | Initial Viscosity at 25° C (cps) | Storage Stability at 24 to 27° C (days) |
|---|---|---|---|---|---|---|
| | | | 150° C | 175° C | | |
| 70 | 30 | 0.25 | 20–30 | — | 80 | >200 |
| 60 | 40 | 0.25 | 50–60 | 40–50 | 57 | 200 |
| 50 | 50 | 0.5 | — | 25–30 | 40 | >250 |
| 50 | 50 | 0.25 | 90–100 | 50–60 | 40 | >350 |
| 40 | 60 | 1.0 | — | 30–40 | 27 | 150 |
| 30 | 70 | 1.0 | — | 40–50 | 22 | >300 |

-continued

| "ERL-4221" | DGENPG | Tetrabutyl titanate | Gel Time (minutes) 150° C | Gel Time (minutes) 175° C | Initial Viscosity at 25° C (cps) | Storage Stability at 24 to 27° C (days) |
|---|---|---|---|---|---|---|
| 40 | 60 | 0.25 | — | 60–75 | 27 | >300 |
| 30 | 70 | 0.25 | — | 75–90 | 22 | >300 |

The above results indicate that the first composition had too much catalyst because its storage stability was low. The results also show that the catalyst concentration which gives the best compromise of gel time and storage stability for cycloaliphatic diepoxides is about 0.4 to about 0.6 phr.

Some of the compositions of this invention, particularly those formulated with cycloaliphatic diepoxides, are very suitable for use as arc and track resistant coatings for phenol-formaldehyde-glass, epoxy-glass, and other laminates. The coatings may be prepared, for example, by brushing the resin on the laminate and curing at about 175° C for about 24 hours.

We claim:
1. A solventless impregnating composition made by
   1. forming a mixture of a liquid diepoxide and about 10 to about 80 phr of the diglycidyl ether of a glycol,
   2. adding to said mixture in an amount sufficient to effect its cure a catalyst consisting essentially of a compound having the general formula

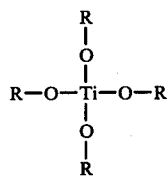

where each R group is independently selected from the group consisting of alkyl from $C_1$ to $C_{10}$, aliphatic, aryl, alkylaryl, cyclic, and heterocyclic.

2. A composition according to claim 1 wherein said catalyst is tetrabutyl titanate, tetraethylhexyl titanate, or mixtures thereof.
3. A composition according to claim 1 wherein the amount of said catalyst is about 5 to about 15 phr when said diepoxide is aromatic, about 0.1 to about 1 phr when said diepoxide is aliphatic, and intermediate when said diepoxide is a mixture of aromatic and aliphatic diepoxides or possesses intermediate properties.
4. A composition according to claim 1 wherein the amount of the diglycidylether of a glycol is about 30 to about 60 phr.
5. A composition according to claim 1 which includes about 50 to about 70 phr of a corona suppressant.
6. A composition according to claim 5 wherein said corona suppressant is alumina trihydrate.
7. A composition according to claim 1 which includes up to about 80 phr of a filler.
8. A composition according to claim 1 wherein said glycol has the general formula HO—R—OH where R is an organic radical having 2 to 12 carbon atoms selected from the group consisting of aliphatic ether, alkylidene, and alkylene.
9. A composition according to claim 8 wherein said glycol is selected from the group consisting of ethylene glycol, propylene glycol, 1,4-butanediol, neopentyl glycol, and mixtures thereof.
10. A method of insulating a conductor comprising wrapping tape around said conductor, placing said conductor in a chamber under sub-atmospheric pressure, immersing said conductor in a composition according to claim 1, and curing said composition.
11. A method according to claim 10 wherein said tape is lap-wrapped mica tape.
12. A method according to claim 10 wherein said composition is cured at about 150° to about 180° C for about 8 to about 24 hours.
13. A conductor wrapped with an insulating tape vacuum-pressure-impregnated with a cured composition according to claim 1.
14. A conductor according to claim 13 wherein said tape is a mica tape.
15. A motor having coils comprising a conductor according to claim 13.
16. A glass laminate coated with a cured composition according to claim 1.
17. A glass laminate according to claim 16 wherein said diepoxide is cycloaliphatic.
18. A composition according to claim 1 wherein said liquid diepoxide has a viscosity of less than about 15,000 cps.
19. A composition according to claim 18 wherein said liquid diepoxide has a viscosity of less than about 350 cps.
20. A composition according to claim 1 wherein said liquid diepoxide is selected from the group consisting of cycloaliphatic diepoxides having epoxy equivalent weights of about 100 to about 350, aliphatic diepoxides having epoxy equivalent weights of about 350 to about 550, aromatic and Novalac diepoxides having epoxy equivalent weights of about 150 to about 600, and mixtures thereof.
21. A composition according to claim 20 wherein the epoxy equivalent weight of said cycloaliphatic diepoxides is about 120 to about 150, the epoxy equivalent weight of said aliphatic diepoxides is about 400 to about 500, and the epoxy equivalent weight of said aromatic and Novalac diepoxides is about 165 to about 225.
22. A composition according to claim 1 wherein said liquid diepoxide is selected from the group consisting of the diglycidyl ether of bisphenol A, 3, 4-epoxycyclohexylmethyl-3, 4-epoxycyclohexane-carboxylate, and mixtures thereof.
23. A composition according to claim 3 wherein the amount of said catalyst is about 7½ to about 10 phr when said diepoxide is aromatic, about 0.4 to about 0.6 phr when said diepoxide is aliphatic, and intermediate when said diepoxide is a mixture of aromatic and aliphatic diepoxides or possesses intermediate properties.
24. A composition according to claim 1 wherein said liquid diepoxide is cycloaliphatic.
25. A composition according to claim 24 wherein said liquid diepoxide is 3,4-epxoy-cyclohexylmethyl-3,4-epoxycyclohexane-carboxylate.

* * * * *